(12) United States Patent
Diephuis et al.

(10) Patent No.: US 11,712,989 B2
(45) Date of Patent: Aug. 1, 2023

(54) CONSOLE TABLE ASSEMBLY FOR A VEHICLE

(71) Applicant: Ford Global Technologies, LLC, Dearborn, MI (US)

(72) Inventors: Jesse Rene Diephuis, West Bloomfield, MI (US); Michael John Harmon, Westland, MI (US); Andrew Brand, Bloomfield Township, MI (US); Ryan Wayne Warner, Ann Arbor, MI (US); Andrew Smith, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/501,317

(22) Filed: Oct. 14, 2021

(65) Prior Publication Data
US 2023/0121069 A1 Apr. 20, 2023

(51) Int. Cl.
*B60N 3/00* (2006.01)
*B60R 11/02* (2006.01)

(52) U.S. Cl.
CPC .......... *B60N 3/001* (2013.01); *B60R 11/0229* (2013.01)

(58) Field of Classification Search
CPC .......... B60N 3/001; B60N 3/002; B60N 3/06; B60R 11/0229; A47B 5/006; A47B 5/04
USPC .................................................... 296/75, 64
See application file for complete search history.

(56) References Cited

U.S. PATENT DOCUMENTS

| | | | | |
|---|---|---|---|---|
| 1,933,210 A | * | 10/1933 | Curtis | A47B 9/00 108/50.14 |
| 2,031,287 A | * | 2/1936 | Swanson | A47B 5/04 248/240.4 |
| 5,615,620 A | * | 4/1997 | Owen | A47B 23/04 108/150 |
| 6,921,118 B2 | | 7/2005 | Clark et al. | |
| 11,465,578 B1 | * | 10/2022 | Llamazares Domper | B60N 3/001 |
| 2007/0157856 A1 | * | 7/2007 | Skoog | A47B 81/061 108/70 |
| 2010/0201163 A1 | * | 8/2010 | Dunkel | B60N 2/32 297/124 |
| 2017/0127824 A1 | * | 5/2017 | Schneider | A47B 3/10 |
| 2020/0023761 A1 | * | 1/2020 | Nishimura | A47B 9/00 |
| 2021/0086678 A1 | * | 3/2021 | Enning | B60R 11/0229 |

FOREIGN PATENT DOCUMENTS

| | | | | |
|---|---|---|---|---|
| CN | 112937414 A | * | 6/2021 | ............ B60N 3/001 |
| DE | 102006044411 A1 | * | 3/2008 | ............ B60N 3/001 |
| DE | 102006044411 A1 | | 3/2008 | |

(Continued)

*Primary Examiner* — Jason S Morrow
*Assistant Examiner* — Wenwei Zhuo
(74) *Attorney, Agent, or Firm* — Price Heneveld LLP; Vichit Chea

(57) ABSTRACT

A console table assembly for a vehicle includes a base movably coupled to a floor of the vehicle, a pivot arm having a first end pivotably coupled to the base and a second end that is distal from the first end, a table pivotably coupled to the pivot arm at the second end and having a top side and an underside opposite the top side, a panel coupled to the table and operable to move relative to the table from a first panel position to second panel position, and a foot rest coupled to the base and operable to move relative to the base from a retracted position to a deployed position.

16 Claims, 6 Drawing Sheets

(56) References Cited

FOREIGN PATENT DOCUMENTS

| | | | | |
|---|---|---|---|---|
| DE | 10200881 B4 * | 2/2017 | ............. | A47B 31/06 |
| FR | 3055593 A1 * | 3/2018 | ........... | A47B 13/081 |

* cited by examiner

CONSOLE TABLE ASSEMBLY FOR A VEHICLE

FIELD OF THE DISCLOSURE

The present disclosure generally relates to a console table assembly for a vehicle. More specifically, the present disclosure relates to a console table assembly that includes a base, a pivot arm, and a table.

BACKGROUND OF THE DISCLOSURE

Vehicle interiors typically include a console box. Console boxes are often stationary within the vehicle interior and lack modularity.

SUMMARY OF THE DISCLOSURE

According to a first aspect of the present disclosure, a console table assembly for a vehicle includes a base coupled to a floor of the vehicle, a pivot arm having a first end pivotably coupled to the base and a second end that is distal from the first end, a table pivotably coupled to the pivot arm at the second end and having a top side and an underside opposite the top side, and a foot rest coupled to the base and operable to move relative to the base from a retracted position to a deployed position. The table is operable to move, via pivotal movement of at least one of the pivot arm relative to the base and the table relative to the pivot arm, between a first position and a second position. In the first position, a portion of the top side of the table faces substantially vehicle-upward. In the second position, the portion of the top side of the table faces substantially vehicle-horizontally.

Embodiments of the first aspect of the present disclosure can include any one or a combination of the following features:
- a display screen positioned on the underside of the table;
- a panel coupled to the table and operable to move relative to the table from a first panel position to a second panel position;
- the panel is operable to pivot relative to the table between the first and second panel positions;
- the panel includes a support surface that faces toward the top side of the table in the first panel position and faces substantially vehicle-upward in the second panel position when the table is in the second position;
- the panel conceals a storage compartment within the table in the first panel position and provides access to the storage compartment within the table in the second panel position;
- the foot rest translates between the retracted and deployed positions; and
- the base is movably coupled to the floor and operable to translate within the vehicle.

According to a second aspect of the present disclosure, a console table assembly for a vehicle includes a base coupled to a floor of the vehicle, a pivot arm having a first end pivotably coupled to the base and a second end that is distal from the first end, a table pivotably coupled to the pivot arm at the second end and having a top side and an underside opposite the top side, and a panel coupled to the table and operable to move relative to the table from a first panel position to a second panel position. The table is operable to move, via pivotal movement of at least one of the pivot arm relative to the base and the table relative to the pivot arm, between a first position and a second position. In the first position, a portion of the top side of the table faces substantially vehicle-upward. In the second position, the portion of the top side of the table faces substantially vehicle-horizontally.

Embodiments of the second aspect of the present disclosure can include any one or a combination of the following features:
- the panel is operable to pivot relative to the table between the first and second panel positions;
- the panel includes a support surface that faces toward the top side of the table in the first panel position and faces substantially vehicle-upward in the second panel position when the table is in the second position;
- the panel further includes an exterior surface opposite the support surface that is substantially flush with the underside of the table in the first panel position;
- the panel conceals a storage compartment within the table in the first panel position and provides access to the storage compartment in the second panel position;
- a foot rest coupled to the base and operable to move relative to the base from a retracted position to a deployed position;
- the foot rest is operable to translate between the retracted and deployed positions; and
- the base is movably coupled to the floor and operable to translate within the vehicle.

According to a third aspect of the present disclosure, a console table assembly for a vehicle includes a base movably coupled to a floor of the vehicle, a pivot arm having a first end pivotably coupled to the base and a second end that is distal from the first end, a table pivotably coupled to the pivot arm at the second end and having a top side and an underside opposite the top side, a panel coupled to the table and operable to move relative to the table from a first panel position to a second panel position, and a foot rest coupled to the base and operable to move relative to the base from a retracted position to a deployed position. The table is operable to move, via pivotal movement of at least one of the pivot arm relative to the base and the table relative to the pivot arm, between a first position and a second position. In the first position, a portion of the top side of the table faces substantially vehicle-upward. In the second position, the portion of the top side of the table faces substantially vehicle-horizontally.

Embodiments of a third aspect of the present disclosure can include any one or a combination of the following features:
- the panel includes a support surface that faces toward the top side of the table in the first panel position and faces substantially vehicle-upward in the second panel position when the table is in the second position;
- the panel further includes an exterior surface opposite the support surface that is substantially flush with the underside of the table in the first panel position; and
- the panel conceals a storage compartment within the table in the first panel position and provides access to the storage compartment in the second panel position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
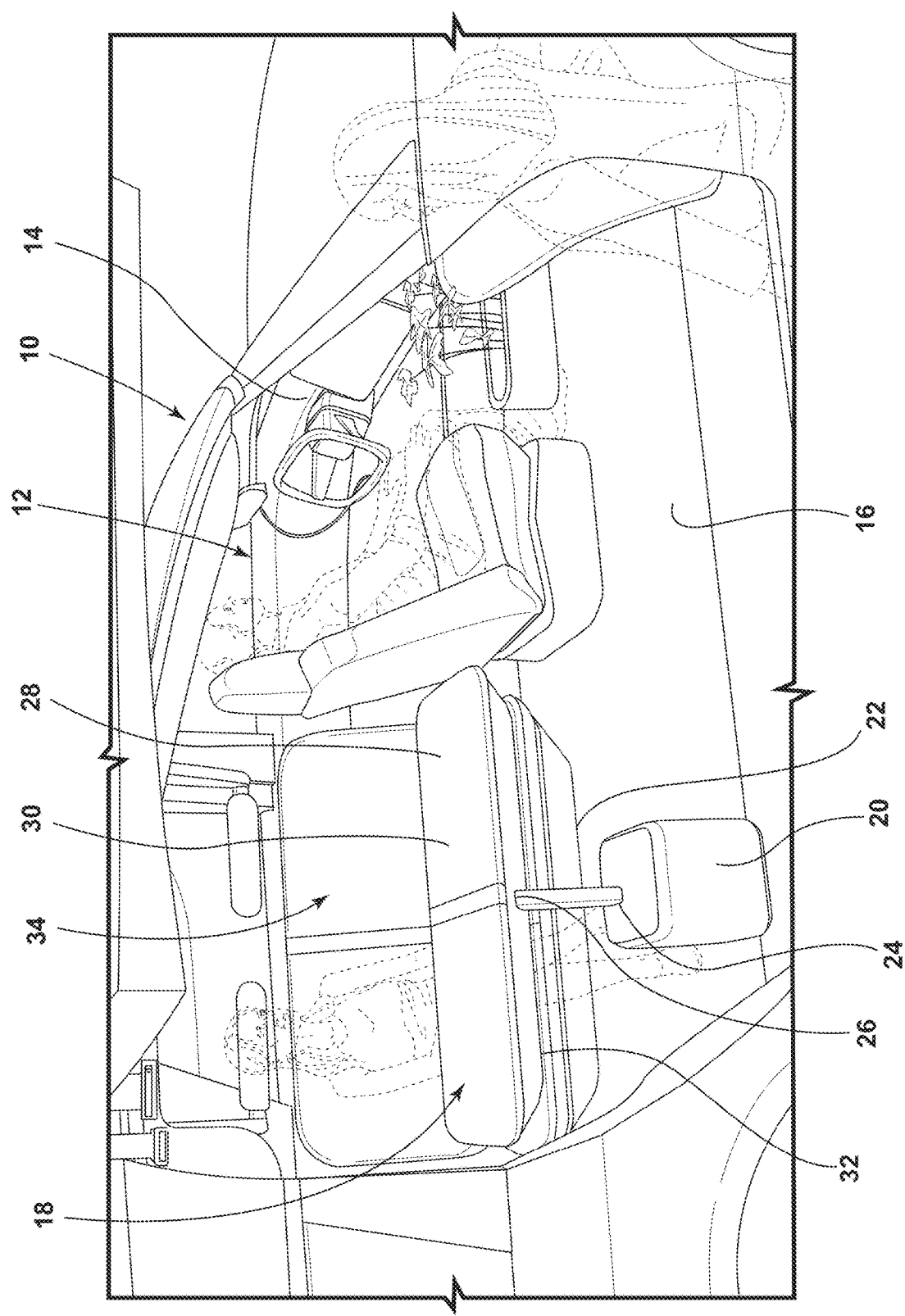
FIG. 1 is a perspective view of a vehicle interior of a vehicle, illustrating a console table assembly positioned in front of a bench-style seating assembly, according to one embodiment.

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-6, a console table assembly 18 for a vehicle 10 includes a base 20. The base 20 is movably coupled to a floor 16 of the vehicle 10. A pivot arm 22 includes a first end 24 that is pivotably coupled to the base 20 and a second end 26 that is distal from the first end 24. A table 28 is pivotably coupled to the pivot arm 22 at the second end 26 of the pivot arm 22. The table 28 includes a top side 30 and an underside 32 that is opposite of the top side 30. The table 28 is operable to move, via pivotal movement of at least one of the pivot arm 22 relative to the base 20 and the table 28 relative to the pivot arm 22, between a first position and a second position. In the first position, a portion of the top side 30 of the table 28 faces substantially vehicle-upward. In the second position, the portion of the top side 30 of the table 28 faces substantially vehicle-horizontally. A panel 38 is coupled to the table 28 and is operable to move relative to the table 28 from a first panel position to a second panel position. A foot rest 46 is coupled to the base 20 and is operable to move relative to the base 20 from a retracted position to a deployed position.

Referring now to FIG. 1, the vehicle 10 includes a vehicle interior 12. A dashboard 14 may be disposed within the vehicle interior 12 at a vehicle-forward end of the vehicle 10. As illustrated in FIG. 1, various vehicle components may be coupled to or positioned at the dashboard 14 (e.g., steering wheel, etc.). The floor 16 of the vehicle 10 may extend beneath the dashboard 14 of the vehicle 10, in some embodiments.

Figure 2:
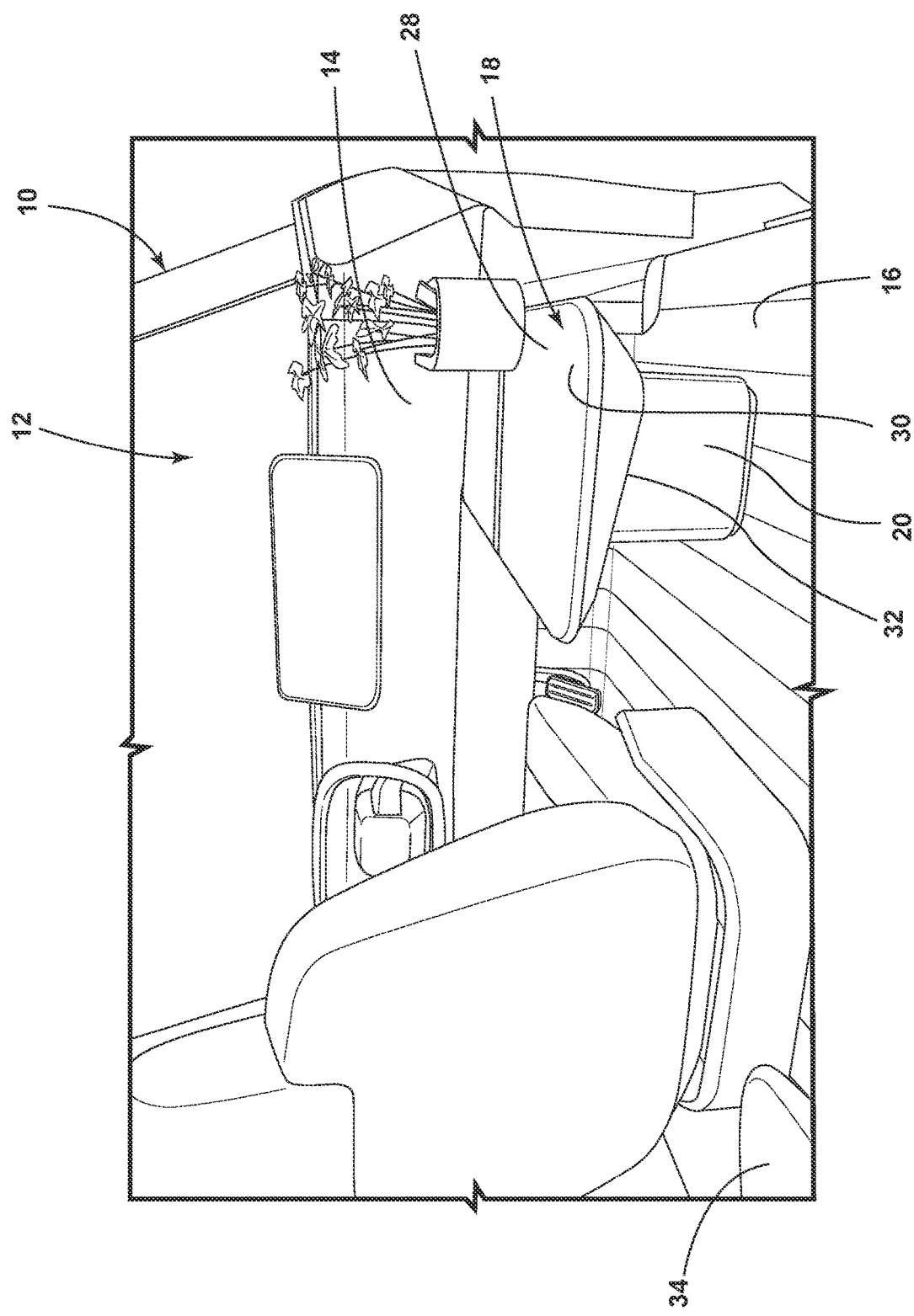
FIG. 2 is a perspective view of the vehicle interior, illustrating the console table assembly positioned beneath a dashboard of the vehicle, according to one embodiment.

Referring now to FIGS. 1 and 2, the console table assembly 18 may be positioned within the vehicle interior 12. The console table assembly 18 includes the base 20. The base 20 may be coupled to the floor 16 of the vehicle 10. In some embodiments, the base 20 may be movably coupled to the floor 16, such that the base 20 may move along the floor 16 of the vehicle 10 within the vehicle interior 12. The base 20 may translate within the vehicle 10, for example, in vehicle-forward and vehicle-rearward directions. It is contemplated that, in some embodiments, the base 20 may move in a variety of manners (e.g., swivel, etc.) and/or directions (vehicle-laterally, vehicle-longitudinally, etc.) within the vehicle 10. The base 20 of the console table assembly 18 may be movably coupled to the floor 16 in a variety of manners. For example, the base 20 may be slidably engaged with a guide track (not shown) mounted to the floor 16 of the vehicle 10, in some embodiments.

Referring still to FIGS. 1 and 2, the console table assembly 18 may include the pivot arm 22. The pivot arm 22 may extend from a first end 24 to a second end 26 that is distal from the first end 24. As illustrated in FIG. 1, the first end 24 may be coupled to the base 20 of the console table assembly 18. In various embodiments, the first end 24 may be pivotably coupled to the base 20.

Referring now to FIGS. 1-4, the console table assembly 18 includes the table 28. The table 28 includes a top side 30 and an underside 32. The underside 32 of the table 28 may be opposite the top side 30 of the table 28. In some configurations of the console table assembly 18, the top side 30 of the table 28 may be used as a table-top surface by a user, as described further herein. In such configurations, the underside 32 of the table 28 generally faces the floor 16 of the vehicle 10 and the top side 30 of the table 28 faces substantially vehicle-upward.

Figure 3:
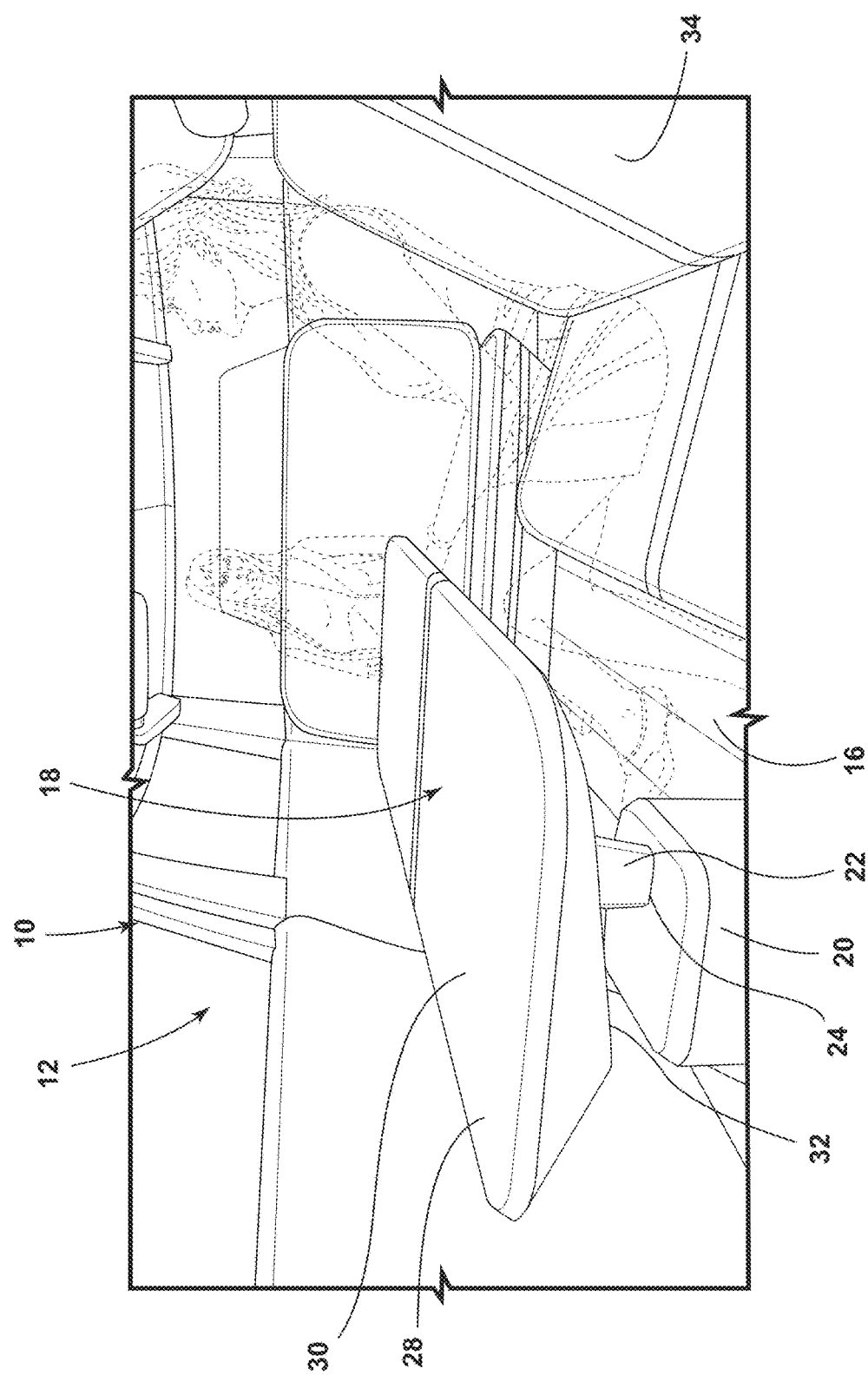
FIG. 3 is a perspective view of the vehicle interior, illustrating a table of the console table assembly in a first position, according to one embodiment.
Figure 4:
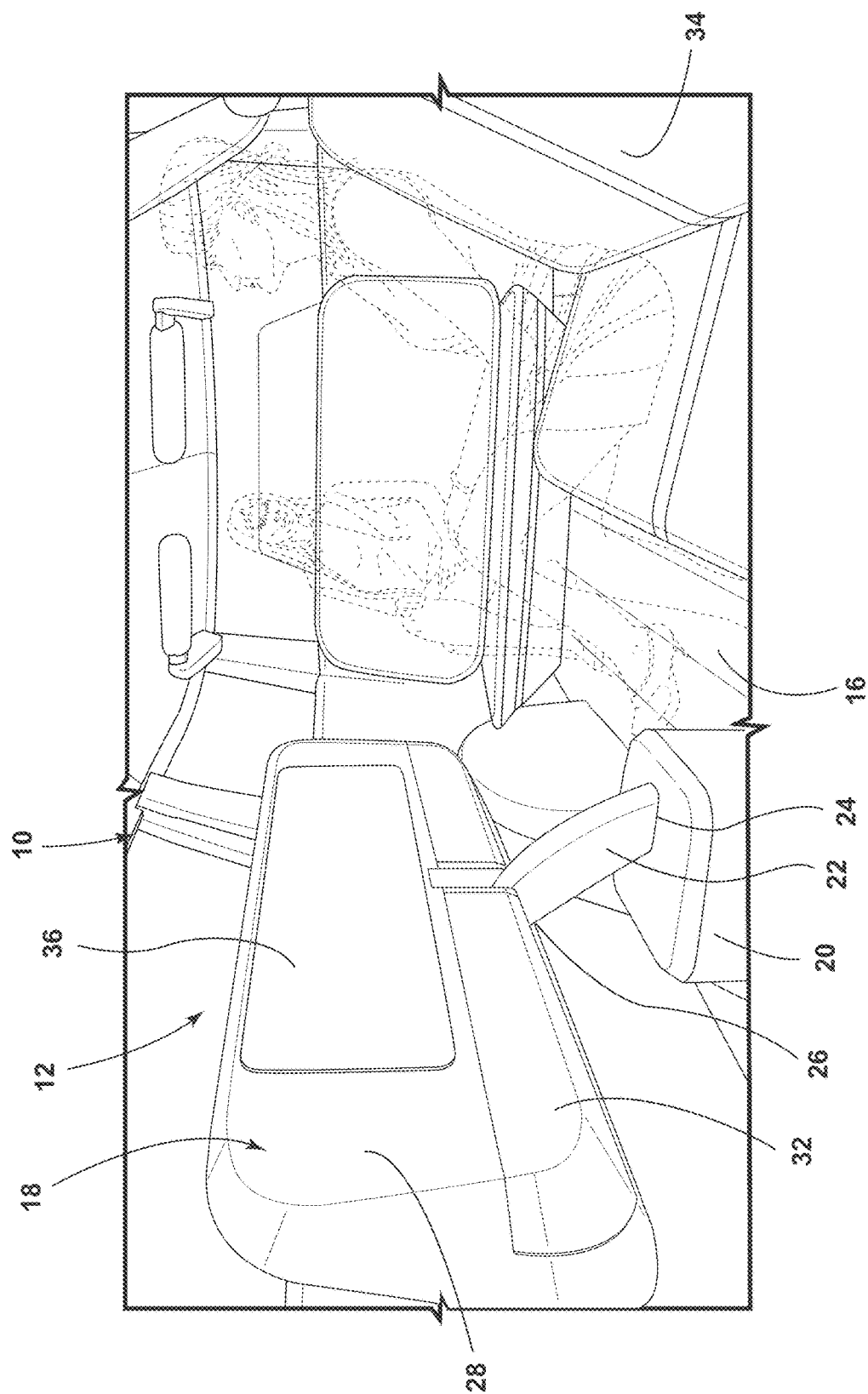
FIG. 4 is a perspective view of the vehicle interior, illustrating the table of the console table assembly in a second position, wherein an underside of the table faces substantially vehicle-horizontally, according to one embodiment.

As illustrated in FIGS. 1, 3, and 4, the table 28 is coupled to the pivot arm 22. The table 28 may be coupled to the pivot arm 22 at the second end 26 of the pivot arm 22. In various embodiments, the table 28 may be pivotably coupled to the pivot arm 22 at the second end 26, such that the table 28 is operable to pivot relative to the pivot arm 22, as described further herein. In some embodiments, pivotal movement of the pivot arm 22 relative to the base 20 and/or pivotal movement of the table 28 relative to the pivot arm 22 may enable height adjustments of the table 28 within the vehicle interior 12. For example, in the vehicle interior 12 configuration illustrated in FIG. 1, the table 28 is positioned in front of a bench-style seating assembly 34 of the vehicle 10, and the top side 30 of the table 28 is substantially level and disposed at a first height within the vehicle interior 12. In the vehicle interior 12 configuration illustrated in FIG. 2, the console table assembly 18 is moved vehicle-forward via movement of the base 20 along the floor 16, and the top side 30 of the table 28 (still substantially level) is disposed at a second height that is less than the first height. In the embodiment illustrated in FIGS. 1 and 2, the height adjustment of the table 28, while maintaining the substantially level condition of the top side 30 of the table 28, is achieved via pivotal movement of both the pivot arm 22 relative to the base 20 and the table 28 relative to the pivot arm 22. The table 28 being height adjustable may advantageously allow the table 28 to both comfortably accommodate a seated user, as illustrated in FIG. 1, and be conveniently stowed beneath the dashboard 14 of the vehicle 10, as illustrated in FIG. 2.

Referring now to FIGS. 3 and 4, in various embodiments, the table 28 may be operable between a first position, wherein a portion of the top side 30 of the table 28 faces substantially vehicle-upward, and a second position, wherein the portion of the top side 30 of the table 28 faces substantially vehicle-horizontally. The table may move between the first and second positions via pivotal movement of at least one of the pivot arm 22 relative to the base 20 and the table 28 relative to the pivot arm 22. For example, in the embodiment illustrated in FIGS. 3 and 4, the table 28 moves from the first position (FIG. 3) to the second position (FIG. 4) via pivotal movement of both the pivot arm 22 relative to the base 20 and the table 28 relative to the pivot arm 22.

As illustrated in FIGS. 3 and 4, in various embodiments, the underside 32 of the table 28 may face vehicle-downward in the first position of the table 28 and may face substantially vehicle-horizontally in the second position of the table 28. It is contemplated that the top side 30 and/or the underside 32 of the table 28 may, respectively, face a variety of vehicle-horizontal directions in the second position of the table 28 (e.g., vehicle-laterally, vehicle-longitudinally, etc.).

Figure 5:
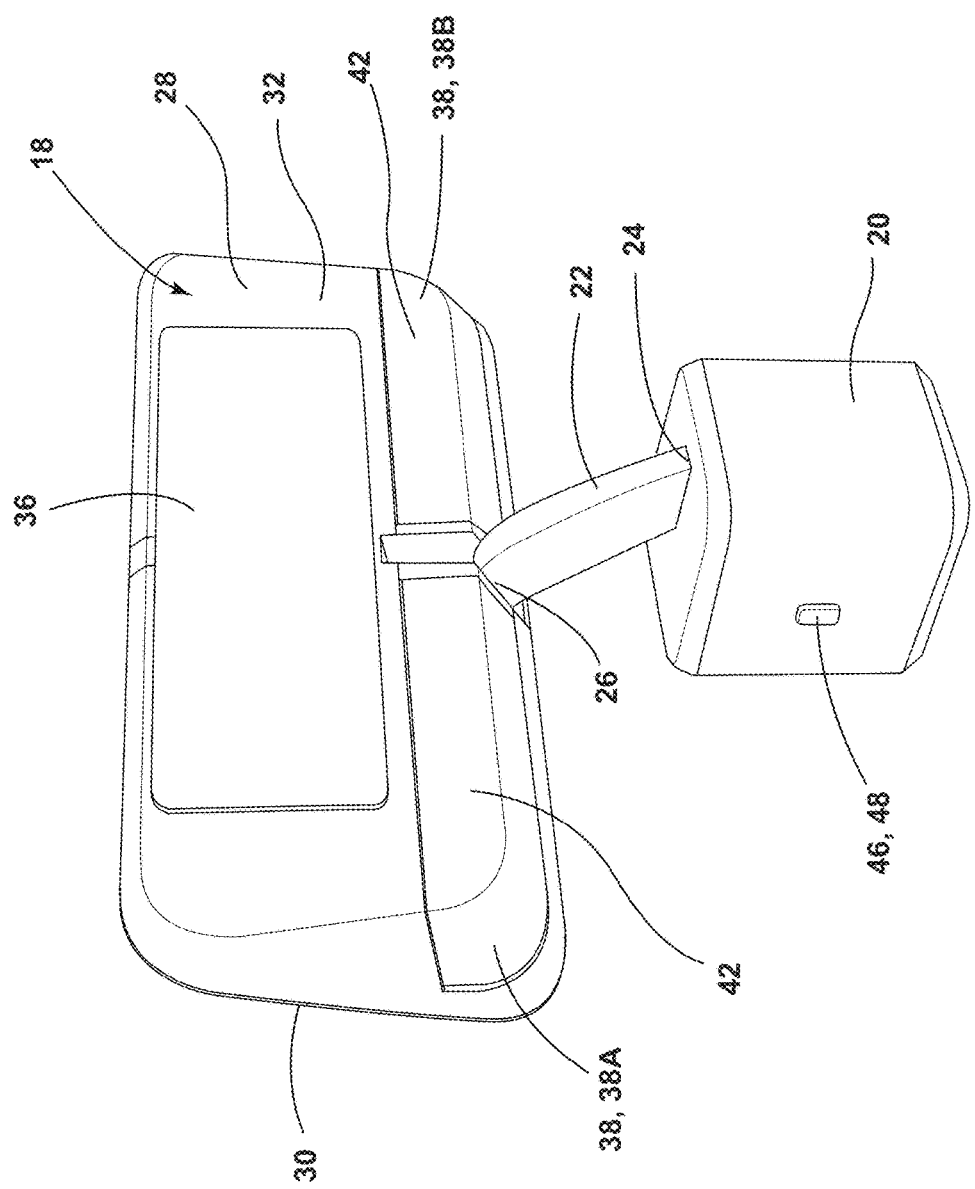
FIG. 5 is a perspective view of the console table assembly, illustrating the table in the second position, a panel operably coupled to the table in a first panel position, and a foot rest operably coupled to a base of the console table assembly in a retracted position, according to one embodiment.

Referring now to FIGS. 4 and 5, in some embodiments, the table 28 may include a display screen 36. The display screen 36 may be positioned on the underside 32 of the table 28. For example, as illustrated in FIG. 5, the display screen 36 is substantially flush with the underside 32 of the table 28 and faces the same direction as the underside 32 of the table 28. In various embodiments, moving the table 28 to the second position may position the display screen 36 within the vehicle interior 12, such that the display screen 36 may be conveniently viewed by seated users within the vehicle 10, as illustrated in FIG. 4.

Figure 6:
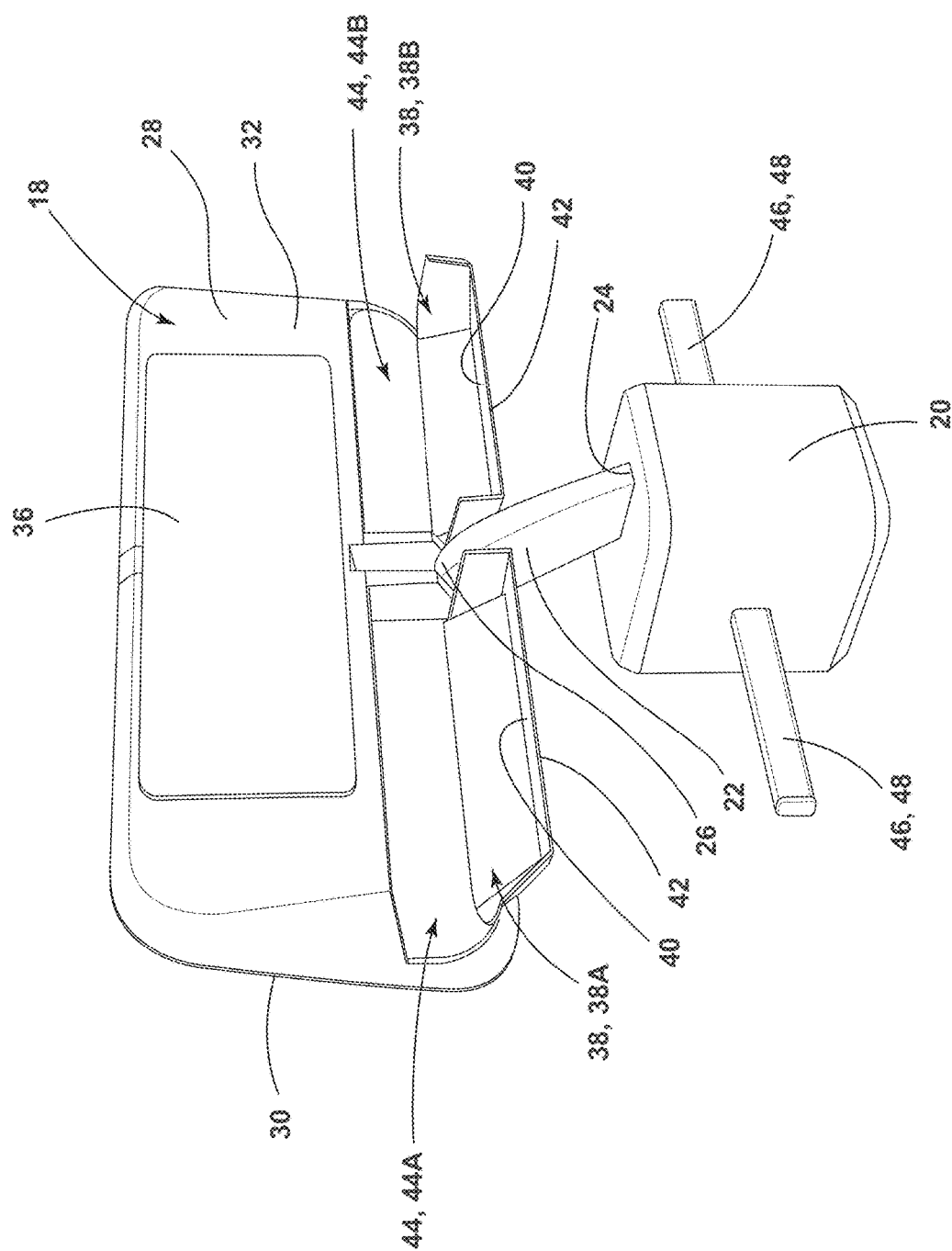
FIG. 6 is a perspective view of the console table assembly, illustrating the table in the second position, the panel in a second panel position, a storage compartment, and the foot rest coupled to the base in a deployed position, according to one embodiment.

Referring now to FIGS. 5 and 6, the panel 38 may be coupled to the table 28. The panel 38 may be operable to move relative to the table 28 from a first panel position to a second panel position. The panel 38 may move relative to the table 28 between the first and second panel positions in a variety of ways, in various embodiments. For example, in some embodiments, the panel 38 may translate between the first and second panel positions. In some embodiments, the panel 38 may be pivotably coupled to the table 28 and operable to pivot between the first and second panel positions. For example, in the embodiment illustrated in FIGS. 5 and 6, the panel 38 is pivotably coupled to the table 28 proximate to the underside 32 of the table 28 and is operable to pivot from the first panel position, as illustrated in FIG. 5, to the second panel position, as illustrated in FIG. 6.

In various embodiments, the panel 38 may include a support surface 40. The support surface 40 may face toward the top side 30 of the table 28 in the first panel position. In some embodiments, the support surface 40 may face substantially vehicle-upward in the second panel position when the table 28 is in the second position. In the embodiment illustrated in FIGS. 5 and 6, wherein the table 28 is in the second position and the panel 38 is pivotably coupled to the table, the panel 38 includes the support surface 40, as illustrated in FIG. 6. The support surface 40 faces vehicle-upward in the second panel position, as shown. As illustrated in FIG. 5, the support surface (not shown) faces toward the top side 30 of the table 28 in the first panel position. In various embodiments, the support surface 40 of the panel 38 faces toward the top side 30 of the table 28 in the first panel position, irrespective of the position of the table 28 of the console table assembly 18. The support surface 40 may be configured to support one or more items of the user (e.g., beverage container, mobile device, etc.) in the second panel position when the table 28 is in the second position, as illustrated in FIG. 6.

Referring still to FIGS. 5 and 6, in some embodiments, the panel 38 may include an exterior surface 42 that is opposite the support surface 40. The exterior surface 42 of the panel 38 may be substantially flush with the underside 32 of the table 28 in the first panel position. For example, as illustrated in FIG. 5, wherein the panel 38 is disposed in the first panel position, the exterior surface 42 of the panel 38 is substantially flush with the underside 32 of the table 28. In various embodiments, surfaces may be flush with each other when the surfaces are coplanar with each other. It is contemplated that curved surfaces may be flush with each other in addition to coplanar surfaces being flush with each other. For example, two curved surfaces that are aligned with each other at adjacent edges may be flush with each other.

Referring still to FIGS. 5 and 6, in some embodiments, the panel 38 may conceal a storage compartment 44 within the table 28 in the first panel position, and access to the storage compartment 44 may be provided in the second panel position. In some implementations, the panel 38 may act as a door that selectively provides access to the storage compartment 44 within the table 28. In such embodiments, the first panel position may correspond with a closed position, and the second panel position may correspond with an open position. In the embodiment illustrated in FIG. 6, the panel 38 opens from the first panel position, illustrated in FIG. 5, to the second panel position, illustrated in FIG. 6, to reveal the storage compartment 44 defined within the table 28.

In some embodiments, the panel 38 may form at least a portion of the storage compartment 44. For example, the panel 38 may be a drawer within the table 28 that is operable to be opened via translation from the first panel position to the second panel position. In such embodiments, the storage compartment 44 at least partially defined by the panel 38 may be concealed by a portion of the panel 38 and/or the table 28 in the first panel position, and movement to the second panel position may reveal the storage compartment 44 defined at least partially by the panel 38. In some embodiments, wherein the panel 38 is a drawer, the support surface 40 of the panel 38 may be the surface of the drawer that faces an opening to the drawer. In some implementations, the opening to the drawer may be positioned vehicle-upward of the support surface 40 when the table 28 is in the second position. Accordingly, the drawer may be configured to be operated by the user in the second position of the table 28. A variety of types of storage compartments 44 are contemplated. Various types of panels 38 of various shapes and sizes are also contemplated.

In some embodiments, the table 28 may include a plurality of panels 38 and/or storage compartments 44. For example, in the embodiment illustrated in FIG. 6, the table 28 includes first and second panels 38A, 38B and first and second corresponding storage compartments 44A, 44B. The first and second panels 38A, 38B and the first and second storage compartments 44A, 44B are coupled to the table 28, such that the pivot arm 22 is pivotably coupled to the table 28 at a position that is between the first panel 38A and the second panel 38B and between the first storage compartment 44A and the second storage compartment 44B.

Referring still to FIGS. 5 and 6, in some embodiments, the console table assembly 18 may include the foot rest 46. The foot rest 46 may be coupled to the base 20. In some embodiments, the foot rest 46 may be operably coupled to the base 20 and movable relative to the base 20 between a retracted position and a deployed position. In various embodiments, the foot rest 46 may extend further from the base 20 in the deployed position than in the retracted position. For example, in the embodiment illustrated in FIGS. 5 and 6, the foot rest 46 extends outward from the base 20 further in the deployed position, as illustrated in FIG. 6, than in the retracted position, as illustrated in FIG. 5.

In various embodiments, the foot rest 46 may move between the retracted and deployed positions in a variety of manners. For example, in some embodiments, the foot rest 46 may pivot between the retracted and deployed positions. In the embodiment illustrated in FIGS. 5 and 6, the foot rest 46 translates between the retracted and deployed positions. In the illustrated embodiment, the foot rest 46 comprises an elongated member 48 that is configured to nest within the base 20 in the retracted position and extend outward from the base 20 in the deployed position. It is contemplated that the foot rest 46 may be at least one of a variety of shapes, in various embodiments. Further, in some embodiments, the foot rest 46 may be an assembly of a plurality of components. In some embodiments, the console table assembly 18 may include a plurality of foot rests 46. For example, as illustrated in FIG. 6, first and second foot rests 46 are operably coupled to opposite sides of the base 20 of the console table assembly 18.

In various embodiments, the vehicle 10 may include one or more actuators that are operable to actuate to move one or more components of the console table assembly 18 within the vehicle 10. For example, the vehicle 10 may include a base actuator configured to move the base 20 along the floor 16 of the vehicle 10, a pivot arm actuator configured to pivot the pivot arm 22 relative to the base 20, a table actuator configured to pivot the table 28 relative to the pivot arm 22, a panel actuator operable to move the panel 38 relative to the table 28 between the first and second panel positions, and/or a foot rest actuator operable to move the foot rest 46 between the retracted and deployed positions. The one or more actuators may be in communication with a controller of the vehicle 10 that receives inputs from various sources (e.g., sensors, input devices, etc.) and controls the one or more actuators responsively.

In operation of an exemplary embodiment of the console table assembly 18, the table 28 is initially in the first position, such that the top side 30 of the table 28 is substantially level and faces substantially vehicle-upward. In the first position of the table 28, the user seated in the seating assembly 34 adjacent to the console table assembly 18 may utilize the top side 30 of the table 28 as a table-top surface. Next, the pivot arm 22 pivots relative to the base 20 and the table 28 pivots relative to the pivot arm 22 to move the table 28 from the first position, as illustrated in FIG. 3, to the second position, as illustrated in FIG. 4. In the second position, the display screen 36 disposed on the underside 32 of the table 28 is oriented to face the user seated in the seating assembly 34. Next, the foot rest 46 is moved from the retracted position to the deployed position, as illustrated in FIGS. 5 and 6, respectively, and the panel 38 is moved from the first panel position to the second panel position. In this configuration, the user may rest an item on the support surface 40 of the panel 38 and utilize the foot rest 46 to support the feet of the user.

The console table assembly 18 of the present disclosure may provide a variety of advantages. First, the base 20 of the console table assembly 18 being movable within the vehicle interior 12 along the floor 16 may allow the table 28 to be moved to accommodate variously positioned users of the vehicle 10. Second, the table 28 being pivotably coupled to the pivot arm 22 and the pivot arm 22 being pivotably coupled to the base 20 may allow for height adjustments of the table 28. Third, the table 28 being movable between the first and second positions may provide a table-top surface when desired and a conveniently viewable display screen 36 when desired, alternatively.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A console table assembly for a vehicle, comprising:
a base coupled to a floor of the vehicle;
a pivot arm having a first end pivotably coupled to the base and a second end that is distal from the first end;
a table pivotably coupled to the pivot arm at the second end and having a top side and an underside opposite the top side, the table being operable to move, via pivotal movement of at least one of the pivot arm relative to the base and the table relative to the pivot arm, between a first position, wherein a portion of the top side of the table faces substantially vehicle-upward, and a second position, wherein the portion of the top side of the table faces substantially vehicle-horizontally;
a foot rest coupled to the base and operable to move relative to the base from a retracted position to a deployed position; and
a display screen positioned on the underside of the table.

2. The console table assembly of claim 1, further comprising:
a panel coupled to the table and operable to move relative to the table from a first panel position to a second panel position.

3. The console table assembly of claim 2, wherein the panel is operable to pivot relative to the table between the first and second panel positions.

4. The console table assembly of claim 3, wherein the panel includes a support surface that faces toward the top side of the table in the first panel position and faces substantially vehicle-upward in the second panel position when the table is in the second position.

5. The console table assembly of claim 2, wherein the panel conceals a storage compartment within the table in the first panel position and provides access to the storage compartment within the table in the second panel position.

6. The console table assembly of claim 1, wherein the foot rest translates between the retracted and deployed positions.

7. The console table assembly of claim 1, wherein the base is movably coupled to the floor and operable to translate within the vehicle.

8. A console table assembly for a vehicle, comprising:
a base coupled to a floor of the vehicle;
a pivot arm having a first end pivotably coupled to the base and a second end that is distal from the first end;
a table pivotably coupled to the pivot arm at the second end and having a top side and an underside opposite the top side, the table being operable to move, via pivotal movement of at least one of the pivot arm relative to the base and the table relative to the pivot arm, between a first position, wherein a portion of the top side of the table faces substantially vehicle-upward, and a second position, wherein the portion of the top side of the table faces substantially vehicle-horizontally; and
a panel coupled to the table and operable to pivot relative to the table from a first panel position to a second panel position, wherein the panel comprises:
a support surface that faces toward the top side of the table in the first panel position and faces substantially vehicle-upward in the second panel position when the table is in the second position; and
an exterior surface opposite the support surface that is substantially flush with the underside of the table in the first panel position.

9. The console table assembly of claim 8, wherein the panel conceals a storage compartment within the table in the first panel position and provides access to the storage compartment in the second panel position.

10. The console table assembly of claim 8, further comprising:
a foot rest coupled to the base and operable to move relative to the base from a retracted position to a deployed position.

11. The console table assembly of claim 10, wherein the foot rest is operable to translate between the retracted and deployed positions.

12. The console table assembly of claim 8, wherein the base is movably coupled to the floor and operable to translate within the vehicle.

13. A console table assembly for a vehicle, comprising:
a base movably coupled to a floor of the vehicle;
a pivot arm having a first end pivotably coupled to the base and a second end that is distal from the first end;
a table pivotably coupled to the pivot arm at the second end and having a top side and an underside opposite the top side, the table being operable to move, via pivotal movement of at least one of the pivot arm relative to the base and the table relative to the pivot arm, between a first position, wherein a portion of the top side of the table faces substantially vehicle-upward, and a second position, wherein the portion of the top side of the table faces substantially vehicle-horizontally;
a panel coupled to the table and operable to move relative to the table from a first panel position to a second panel position; and
a display screen positioned on the underside of the table.

14. The console table assembly of claim 13, wherein the panel comprises:
a support surface that faces toward the top side of the table in the first panel position and faces substantially vehicle-upward in the second panel position when the table is in the second position.

15. The console table assembly of claim 14, wherein the panel further comprises:
an exterior surface opposite the support surface that is substantially flush with the underside of the table in the first panel position.

16. The console table assembly of claim 13, wherein the panel conceals a storage compartment within the table in the first panel position and provides access to the storage compartment in the second panel position.

\* \* \* \* \*